Figure 1:
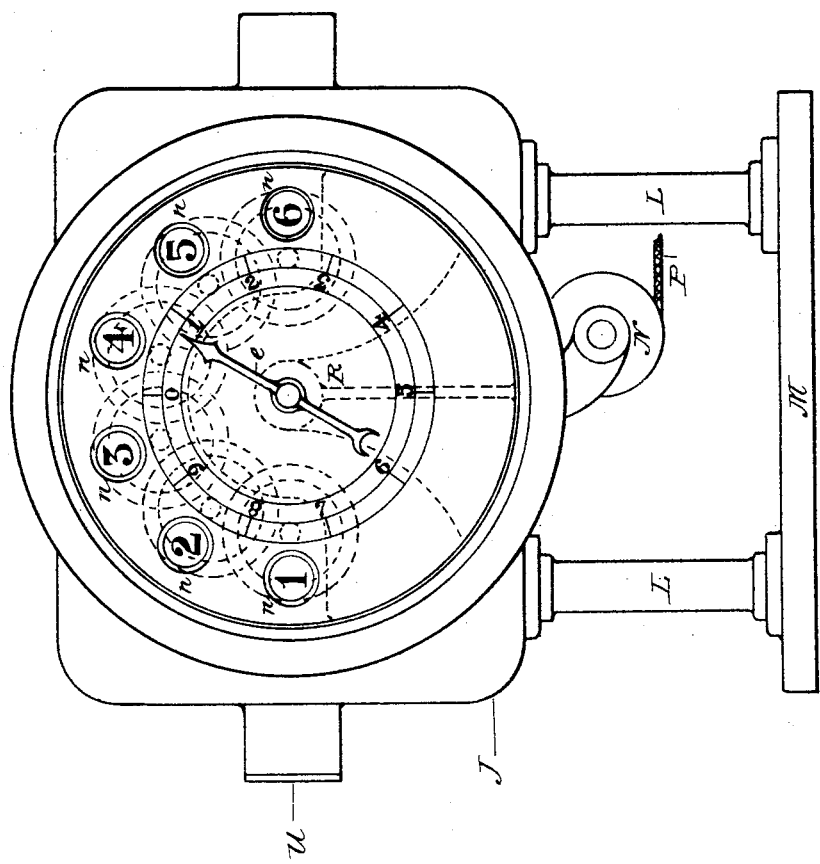

(No Model.) 4 Sheets—Sheet 1.

G. P. ABORN.
REGISTER FOR MEASURING LENGTHS OF VARYING RECIPROCATING STROKES.

No. 536,252. Patented Mar. 26, 1895.

Witnesses
Chas H Smith
J. Staib

Inventor
George P. Aborn
per Lemuel W. Serrell
Atty (No Model.) 4 Sheets—Sheet 2.

G. P. ABORN.
REGISTER FOR MEASURING LENGTHS OF VARYING RECIPROCATING STROKES.

No. 536,252. Patented Mar. 26, 1895.

Witnesses
Chas N Smith
J. Staib

Inventor
George P. Aborn
per Lemuel W. Serrell Atty (No Model.) 4 Sheets—Sheet 3.

G. P. ABORN.
REGISTER FOR MEASURING LENGTHS OF VARYING RECIPROCATING STROKES.

No. 536,252. Patented Mar. 26, 1895.

Witnesses
Chas. H. Smith
J. Staib

Inventor
George P. Aborn
per Lemuel W. Serrell
Atty.

(No Model.) 4 Sheets—Sheet 4.

G. P. ABORN.
REGISTER FOR MEASURING LENGTHS OF VARYING RECIPROCATING STROKES.

No. 536,252. Patented Mar. 26, 1895.

Witnesses
Chas H. Smith
J. Staib

Inventor
George P. Aborn
per Lemuel W. Serrell
Atty

UNITED STATES PATENT OFFICE.

GEORGE P. ABORN, OF WARREN, MASSACHUSETTS.

REGISTER FOR MEASURING LENGTHS OF VARYING RECIPROCATING STROKES.

SPECIFICATION forming part of Letters Patent No. 536,252, dated March 26, 1895.

Application filed April 13, 1894. Serial No. 507,350. (No model.)

*To all whom it may concern:*

Be it known that I, GEORGE P. ABORN, a citizen of the United States, residing at Warren, in the county of Worcester and State of Massachusetts, have invented an Improvement in Means for Measuring the Travel of Pistons, &c., of which the following is a specification.

This invention is an instrument for registering the piston travel of engines and is especially applicable to that class of engines known as non-rotative, and whose strokes are variable.

The object of the invention is to measure and register the actual piston travel of the engine regardless of the length or number of the strokes of said engine.

The counters that are now used on direct-acting non-rotative engines do not meet the requirements that are demanded for accurately measuring and recording the work of the engine because the length of stroke on this type of engine is variable and the number of strokes indicated by the counter multiplied by the normal stroke of the engine does not give the actual piston travel, as the length of stroke does not in any way affect the counter. For this reason, in duty tests of pumping engines, it is necessary to measure the stroke of the engine at intervals of fifteen minutes and at the end of the test to average these readings; nor does this entirely eliminate the error, as, for instance, the engine may run an inch short at one reading and immediately after this reading run full stroke for, say, ten minutes. Then just before the time for the next reading it may run one inch short. The calculated speed would then be less than the actual speed.

My improved instrument gives by direct readings the actual travel of the piston of the engine. It is continuous in its operation and can be read like an ordinary counter.

The divisions of the dial indicate the speed of the engine in feet and fractions of a foot. When used in connection with a test, readings are taken at the instant of beginning and closing of the test. The difference in these readings gives the actual piston travel during the time of the test.

Figures 2, 3:
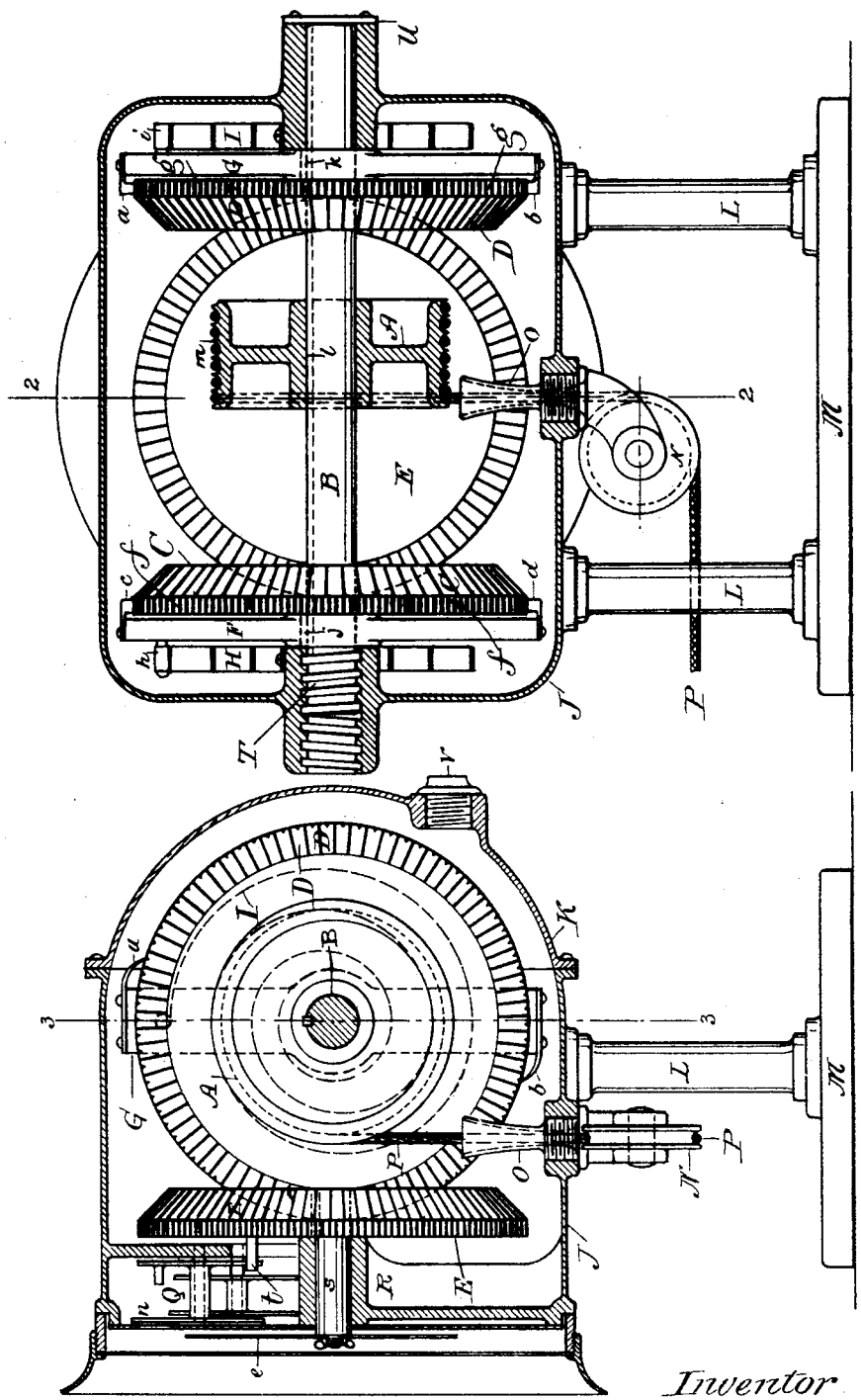
Figure 5:
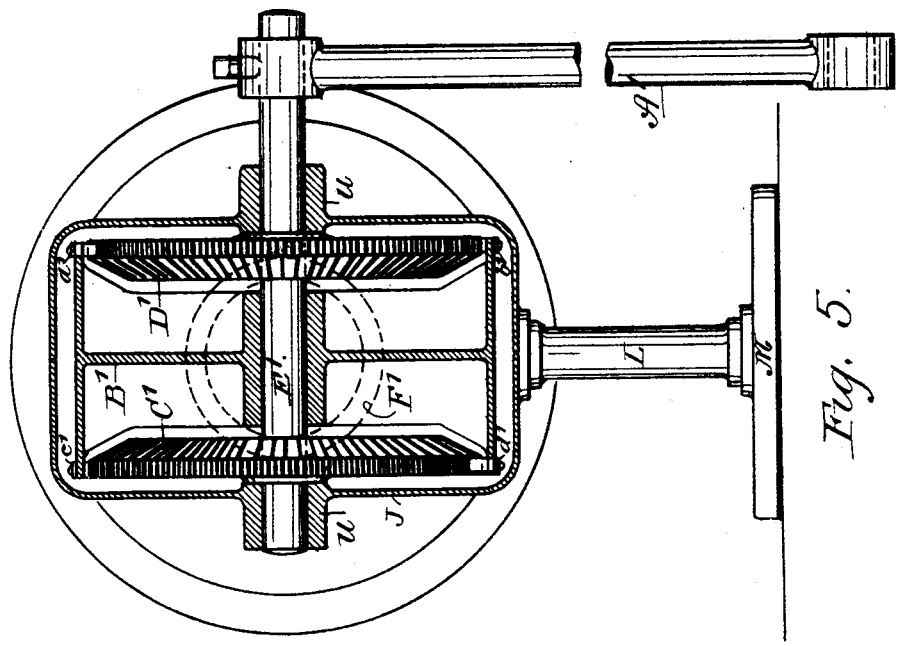
Figure 4:
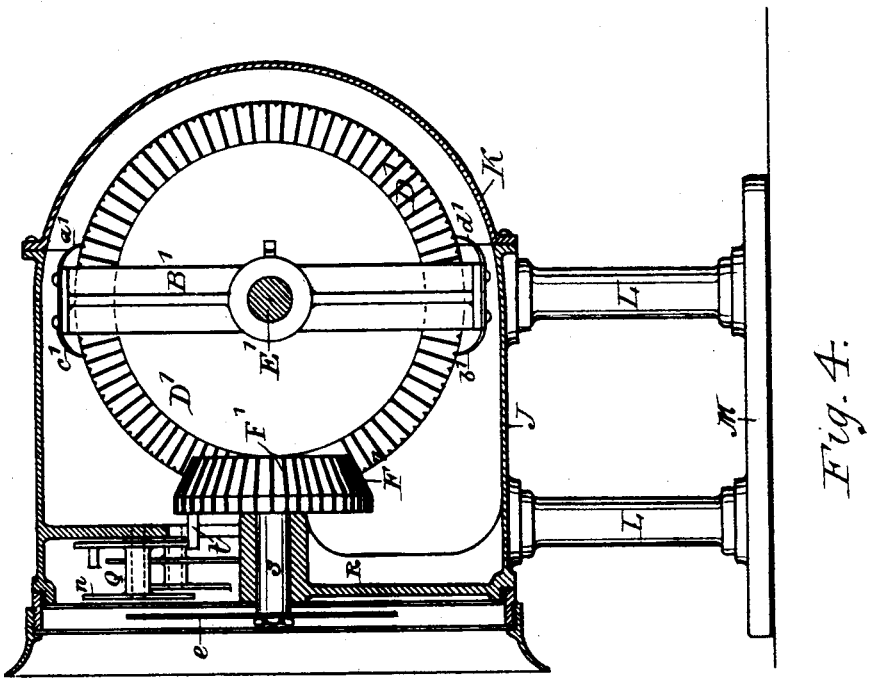
Figure 7:
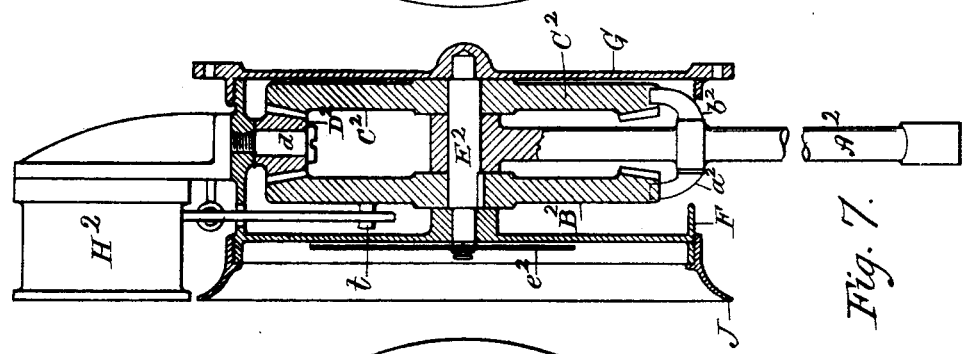
Figure 6:
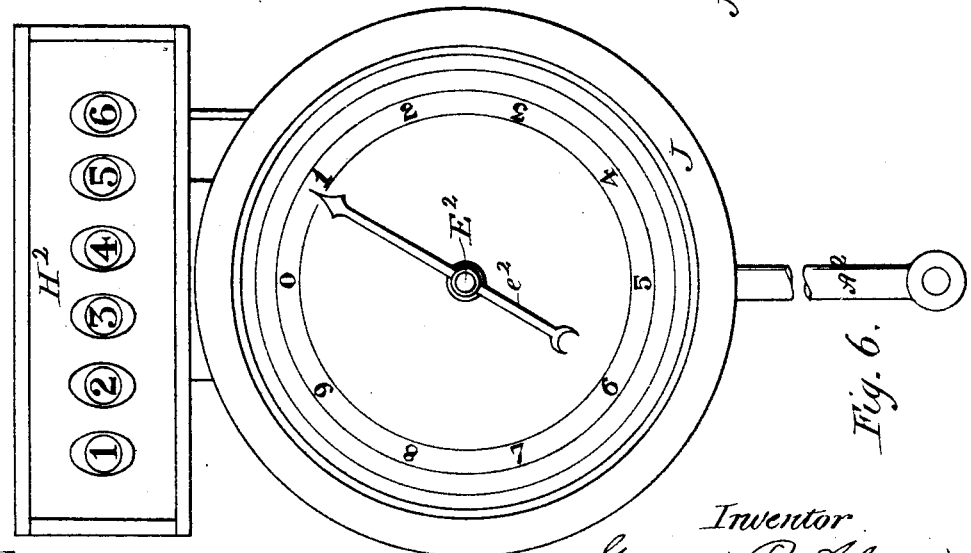

In the drawings:—Figure 1, is a front elevation of the speed register. Fig. 2, is a vertical section near the line 2, in Fig. 3. Fig. 3, is a section near the line 3, in Fig. 2. Figs. 4, and 5, are vertical sections representing the parts adapted to a lever connection to the engine, and Fig. 6, is a face view. Fig. 7, is a section, at the line 7, Fig. 8, and Fig. 8, a rear view of my improvement in a modified form.

The register consists primarily of a number of disks $n$, each having numbers from 0, to 9, arranged upon their faces in a manner common in revolution counters. Opposite the disks $n$, is a face plate which is provided with a number of sight openings, which are so arranged as to expose one figure upon each of the disks, different figures being successively exposed as the disks are progressively rotated.

For the purpose of moving the train of disks $n$, so as to cause them to indicate the number of feet traveled by the piston or other reciprocating device, I provide a system of bevel gearing, ratchet wheels, and pawls, which convert the reciprocating motion of the engine into a continuous rotary motion of the gear E. This gear E, has a projecting stud $t$, which sets in motion the registering mechanism Q, referred to above.

The cord P, is attached to some reciprocating part such as the cross-head of the engine.

N, is a guide pulley for the cord P, supported by an arm from a vertical socket on which the arm can be turned in any desired direction.

A, is a drum upon which the cord P, is wound. The drum A, is keyed rigidly to the shaft B, and the bevel gears C, and D, are loose upon the shaft B, and there are serrations cut into their peripheries at $f$, and $g$.

The shaft B, passes freely through the arms F, and G, and there are feathers $j$, and $k$, secured in the hubs of these arms which feathers fit in key ways in the shaft B, thus allowing the shaft B, to slide through the arms F, and G, while any rotary motion of the shaft B, will be transmitted to the arms F, and G. At the ends of the arms F, and G, are the pawls $a$, and $b$, $c$, and $d$, which project over and engage the serrations in the peripheries of the gears C, and D. On the arms F, and G, are also studs $h$, and $i$, to which are attached the spiral or volute springs H, and I.

The other ends of these springs H, and I, are attached to the hubs of the casing J.

The shaft B, has a key-way cut its entire length except at the end upon which is the thread T. The thread T, is of the same pitch as the helical grooves $m$, around the drum A, which receives the cord P. The thread T, on the shaft fits the thread in the hub of the casing J. By this device an end motion is given to the shaft as it is rotated so that the cord P, always leaves the drum A, opposite the guide O.

The operation of the instrument is as follows: The cord P, being attached to some reciprocating part of the engine, say the crosshead, in such a manner that it has the same travel and direction of motion, it communicates this motion to the drum A, which is of such a diameter that twelve inches or one foot travel of cord P, will cause the drum A, to make exactly one revolution. The motion of the drum A, is given to the arms F, and G, through the shaft B. When the cord P, is pulled, the drum A, and arms F, and G, revolve in a left handed direction when looking at the instrument as in Fig. 2. The pawls $c$, and $d$, on the arm F, engage with the serrations on the gear C, causing it to revolve with the arm F, and imparting a right-handed rotation to the gear E, when looking at the instrument as in Fig. 1. The pawls $a$, and $b$, on the arm G, slip over the serrations on the gear D, as the arm G, and gear D, revolve in different directions; and during this movement, the volute springs H, and I, are wound up. When the engine begins its return stroke the cord P, is released and the springs H and I, exert their power, and, keeping the cord P, taut, revolve the arms F, and G, and the drum A, in a right-handed direction when looking at the instrument as in Fig. 2. The pawls $a$, and $b$, on the arm G, during this movement engage the serrations $g$, on the gear D, and cause this gear to revolve and turn the gear E, in a right handed direction when looking at the instrument as in Fig. 1. The pawls $c$, and $d$, slip over the serrations $f$, on the gear C, as the parts revolve. Thus the gear E, will always be revolved in one direction by a reciprocating motion in either direction acting on the cord P. It is also evident that for every twelve inches traveled by the cord P, the gear E, will make one revolution as the gears C, D, and E, are of the same size. Besides the registering mechanism Q, which is operated by gear E, through a stud $t$, there can be a pointer $e$, attached to the shaft S, of the gear E. This pointer $e$, revolves on a dial which is marked to show tenths of a foot or other divisions.

Figs. 4, and 5, show a modification of my improvement. The arm A′, is to be attached by a link or other suitable means to the crosshead or other reciprocating part and it is fastened to and turns the shaft E′, and operates the gears C′, D′, and F′, through the arm B′, and pawls $a'$, and $b'$, and $c'$, and $d'$, similarly to the devices in Figs. 2, and 3. The mechanism Q, and pointer $e$, for registering the tenths of feet traveled by the engine can be the same as shown in Figs. 1, 2, and 3. The length of the arm A′, and size of gear F′, can be changed for different lengths of stroke of different engines.

Figure 8:
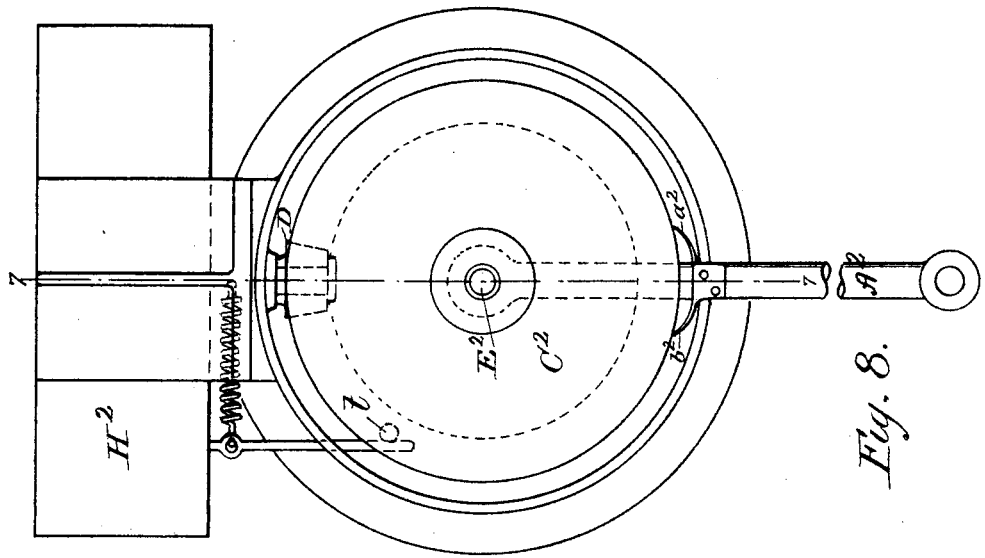

Figs. 6, 7, and 8, represent a modified arrangement of the parts for adapting the improvement to engines with strokes of from ten to twenty inches, in length. The case $H^2$, contains a counter mechanism of any suitable character. The arm $A^2$, and the gears $B^2$, $C^2$, and $D^2$, are arranged with the pawls $a^2$, and $b^2$, to give a progressive rotary motion in one direction to the gear $B^2$. The gear $B^2$, is fastened to the shaft $E^2$, while the gear $C^2$, is loose upon it. Each revolution of the gear $B^2$, and pointer $e^2$, represents a piston travel of say ten feet and the dial figures represent feet while the right hand figure in the counter $H^2$, represents so many tens of feet as for instance 6 would stand for sixty feet. The reading of the instrument as shown by counter and dial in Fig. 6, is then—1234560.8. The arm $A^2$, is attached by a link or by other suitable means to the cross-head or other reciprocating part of the engine or other device.

This instrument may be made to indicate meters or other measures of distance instead of feet.

The above described instruments besides being of great utility in duty trials are of value to engineers in charge of direct acting pumping engines on oil lines, waterworks, &c., where a daily record is required of the performance of the engines and the number of gallons pumped in the twenty-four hours.

Instruments like the above may indicate the number of gallons pumped instead of showing the number of feet traveled by the piston, the parts being properly proportioned and marked.

This instrument is supported in any suitable manner such as by the columns L, and base M.

A screw plug V, in the case K, may be provided and the counting mechanism and shaft S, may be supported by the standard R.

I am aware that treadles and other devices that are moved alternately have been connected by cords and other devices with lever arms and pawls to convert such alternate movements into a rotary motion.

By combining with the means for converting the reciprocating motion into the rotary movement, a counting or distance measuring instrument, I am enabled to ascertain and register the distance traveled by a piston or similar device regardless of the number of reciprocations or the variations in the lengths of the different reciprocations.

I claim as my invention—

1. The combination with a counting mechanism, of a revolving gear to actuate such counter, two gears therewith engaging, and teeth on the edges of two of the gears, pawls engaging the teeth in opposite directions, a shaft and arms carrying the pawls, a barrel on the shaft and a cord connected to the barrel and extending to the engine cross-head or other reciprocating device, and a screw for giving end motion to the shaft as rotated, substantially as specified.

2. The combination with a counting mechanism of a revolving gear to actuate such counter, two gears therewith engaging and ratchet teeth on the edges of two of the gears, pawls engaging the teeth in opposite directions, a shaft and arms carrying said pawls and means for turning the shaft first in one direction and then in the other substantially as specified.

3. The combination with a counting mechanism, of a revolving gear to actuate such counter, two gears therewith engaging and ratchet teeth on the edges of two of the gears, pawls engaging the teeth in opposite directions, a shaft and arms carrying the pawls, a barrel on the shaft and a cord connected to the barrel and extending to the engine cross-head or other reciprocating device, springs that are wound up as the cord is drawn off and which rotate the shaft and barrel to wind up the cord substantially as specified.

4. The combination with a counting mechanism, of a revolving gear to actuate such counter, two gears therewith engaging and teeth on the edges of two of the gears, pawls engaging the teeth in opposite directions, a shaft and arms carrying the pawls, a barrel on the shaft and a cord connected to the barrel and extending to the engine cross-head or other reciprocating device, springs that are wound up as the cord is drawn off and which rotate the shaft and barrel to wind up the cord, and a screw for giving end motion to the shaft as rotated substantially as specified.

5. The combination with a counting mechanism, of a revolving gear to actuate such counter, two gears therewith engaging and teeth on the edges of two of the gears, pawls engaging the teeth in opposite directions, a shaft and arms carrying the pawls, a barrel on the shaft and a cord connected to the barrel and extending to the engine cross-head or other reciprocating device, springs that are wound up as the cord is drawn off and which rotate the shaft and barrel to wind up the cord, a screw for giving end motion to the shaft as rotated and a guide and pulley for the cord, substantially as specified.

Signed by me this 9th day of April, 1894.

GEORGE P. ABORN.

Witnesses:
GEO. DE LAVAL,
FRED E. COOK.